US006562488B1

(12) United States Patent
Chen et al.

(10) Patent No.: US 6,562,488 B1
(45) Date of Patent: May 13, 2003

(54) COCRPTTANBB ALLOY FOR MAGNETIC RECORDING MEDIUM

(75) Inventors: Qixu (David) Chen, Milpitas, CA (US); Samuel Dacke Harkness, IV, San Francisco, CA (US); Zhong (Stella) Wu, Fremont, CA (US); Lin Huang, San Jose, CA (US); Rajiv Yadav Ranjan, San Jose, CA (US); Charles Leu, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/496,340

(22) Filed: Feb. 2, 2000

Related U.S. Application Data

(60) Provisional application No. 60/129,309, filed on Apr. 14, 1999.

(51) Int. Cl.[7] .............................. G11B 5/66; G11B 5/70; B32B 15/00; B05D 5/12; H01F 1/00
(52) U.S. Cl. .......................... 428/694 T; 428/694 TS; 428/611; 428/667; 428/336; 428/900; 427/128; 427/131
(58) Field of Search ............... 428/694 T, 694 TS, 428/900, 667, 336, 694 TM, 611; 427/128, 131; 148/313; 420/436

(56) References Cited

U.S. PATENT DOCUMENTS 5,631,094 A * 5/1997 Ranjan et al. ............... 428/611
5,652,054 A * 7/1997 Kikitsu et al. .............. 428/328
5,820,963 A * 10/1998 Lu et al. ..................... 428/65.3
5,900,324 A * 5/1999 Moroishi et al. ............ 428/611
5,945,190 A * 8/1999 Sato ........................... 428/65.3
5,993,956 A * 11/1999 Lambeth et al. ............ 428/332
6,010,795 A * 1/2000 Chen et al. .................. 428/611
6,143,388 A * 11/2000 Bian et al. ................... 428/65.3
6,403,241 B1 * 6/2002 Chen et al. ............. 428/694 TS
6,461,750 B1 * 10/2002 Chen et al. ............ 428/694 TM

FOREIGN PATENT DOCUMENTS

JP    05189738 A    *    7/1993
JP    06140247 A    *    5/1994

OTHER PUBLICATIONS

Akimoto H., et al., IEEE Transactions on Magnetics (1998), 34(4):1597–1599.

* cited by examiner

Primary Examiner—Holly Rickman
(74) Attorney, Agent, or Firm—Morrison & Foerster LLP

(57) ABSTRACT

A magnetic recording medium on glass or Al substrates with film structures of CrV/NiAl/CrMo/CoCrTa/CoCrPtTaNbB and CrMo/CoCrTa/CoCrPtTaNbB exhibit high coercivity and high signal-to-medium noise ratio. The medium can be used for high-density longitudinal magnetic recording. Embodiments include forming a sub-seed layer on a NiP-plated aluminum substrate, and sequentially depositing a seed layer, an underlayer, an intermediate layer and a magnetic layer on the substrate. The magnetic layer contains at least six elements, including Co, Cr and B.

23 Claims, 6 Drawing Sheets

… (1)

CoCrPtTaNbB ALLOY FOR MAGNETIC RECORDING MEDIUM

RELATED APPLICATIONS

This application claims priority from Provisional Application Serial No. 60/129,309 filed Apr. 14, 1999, entitled "CoCrPtTaNbB ALLOY FOR MAGNETIC RECORDING MEDIUM," the entire disclosure of which is hereby incorporated herein by reference.

FIELD OF THE INVENTION

This invention relates to magnetic recording media, such as thin film magnetic recording disks, and to a method of manufacturing the media. The invention has particular applicability to high areal density magnetic recording media exhibiting low noise, and high coercivity.

BACKGROUND

The increasing demands for higher areal recording density impose increasingly greater demands on thin film magnetic recording media in terms of remanant coercivity (Hr), magnetic remanance (Mr), coercivity squareness (S*), medium noise, i.e., signal-to-medium noise ratio (SMNR), and narrow track recording performance. It is extremely difficult to produce a magnetic recording medium satisfying such demanding requirements.

The linear recording density can be increased by increasing the Hr of the magnetic recording medium and by decreasing the medium noise, as by maintaining very fine magnetically non-coupled grains. Medium noise in thin films is a dominant factor restricting increased recording density of high-density magnetic hard disk drives, and is attributed primarily to inhomogeneous grain size and intergranular exchange coupling. Accordingly, in order to increase linear density, medium noise must be minimized by suitable microstructure control.

It is recognized that the magnetic properties, such as Hr, Mr, S* and SMNR, which are critical to the performance of a magnetic alloy film, depend primarily upon the microstructure of the magnetic layer.

In order to increase Hr, magnetic alloys containing platinum (Pt), such as Co—Cr—Pt—tantalum (Ta) alloys have been employed. Although Pt enhances film Hr, it was found that Pt also increases media noise. Accordingly, it has become increasingly difficult to achieve high areal recording density while simultaneously achieving high SMNR and high Hr.

In copending U.S. patent application Ser. No. 09/496,342, filed Feb. 2, 2000, now U.S. Pat. No. 6,403,241, claiming priority from Provisional Application Serial No. 60/129,306 filed Apr. 14, 1999, entitled "CoCrPtB MEDIUM WITH A 1010 CRYSTALLOGRAPHIC ORIENTATION," a magnetic recording medium is disclosed comprising a CoCrPtB magnetic layer.

A magnetic recording medium having a CoCrPtTaNb magnetic layer has been reported. Hideyuki Akimoto et al., "Magnetic Interaction in Co—Cr—Pt—Ta—Nb Media: Utilization of Micromagnetic Simulation," IEEE Transactions an Magnetics, Vol. 34, No. 4, pp. 1597–1599, 1998. However, it was found that difficulties exist in identifying the intergranular exchange coupling constant ($h_e$) via magnetic property measurements and transmission electron microscopy (TEM) observation of actual media. Also, Hideyuki does not disclose the use of B in the magnetic layer.

CoCrPtTaNb and CoCrPtB were used for magnetic recording media and were reported in the literature. Assignee's patent application Ser. No. 09/406,816, filed Sep. 18, 1999, now U.S. Pat. No. 6,461,750, entitled "Magnetic Recording Medium with Dual Magnetic Layer and High In-Plane Coercivity," the entire disclosures of which are hereby incorporated herein by reference, disclosed a medium structure with CoCrPtTaNb alloy. Mrt is continuing to decrease from the current level, for higher areal density products, in order to support smaller inter-bit transitions.

There is a need to find a magnetic alloy, which features low noise and high coercivity (Hc) at low Mrt. There also exists a need for high areal density magnetic recording media exhibiting high Hr and high SMNR. There exists a need for magnetic recording media containing a glass or glass ceramic substrate exhibiting high Hr, and high SMNR.

SUMMARY OF THE INVENTION

An advantage of this invention is a magnetic recording medium for high areal recording density exhibiting low noise and high Hr.

Another advantage of this invention is a method of manufacturing a magnetic recording medium suitable for high areal recording density and exhibiting low noise and high Hr.

Additional advantages and features of this invention will be set forth in part in the description that follows and in part will become apparent to those having ordinary skill in the art upon examination of the following description and from the knowledge gained by practicing the invention. The advantages of this invention may be realized and obtained and are particularly pointed out in the claims.

According to this invention, the foregoing and other advantages are achieved by a magnetic recording medium comprising a substrate and a magnetic layer comprising Co, Cr and B and at least 3 other elements. A 6-element magnetic layer gave certain advantages over recording media having 4-element magnetic layers.

Another aspect of this invention is a method of manufacturing a magnetic recording medium, comprising depositing a sub-seed layer on a substrate; depositing a seed layer on the sub-seed layer, an underlayer on the seed layer; an intermediate layer on the underlayer and depositing a magnetic layer on the intermediate layer. The magnetic layer comprises Co, Cr and B and at least 3 other elements.

Additional advantages of this invention will become readily apparent to those skilled in this art from the following detailed description, wherein only the preferred embodiments of this invention is shown and described, simply by way of illustration of the best mode contemplated for carrying out this invention. As will be realized, this invention is capable of other and different embodiments, and its details are capable of modifications in various obvious respects, all without departing from this invention. Accordingly, the drawings and description are to be regarded as illustrative in nature and not as restrictive.

$Cr_{80}V_{20}/Ni_{50}Al_{50}/Cr_{90}Mo_{10}/Co_{78}Cr_{17}Ta_5/Co_{66.7}Cr_{18}Pt_8Ta_2Nb_2B_{3.3}$;

$Cr_{80}V_{20}/Ni_{50}Al_{50}/Cr_{90}Mo_{10}/Co_{78}Cr_{17}Ta_5/Co_{70}Cr_{18}Pt_6B_6$;

$Cr_{90}Mo_{10}/Co_{78}Cr_{17}Ta_5/Co_{70}Cr_{18}Pt_6B_6$; and $Cr_{90}Mo_{10}/Co_{78}Cr_{17}Ta_5/Co_{66.7}Cr_{18}Pt_8Ta_2Nb_2B_{3.3}$.

Figure 4:
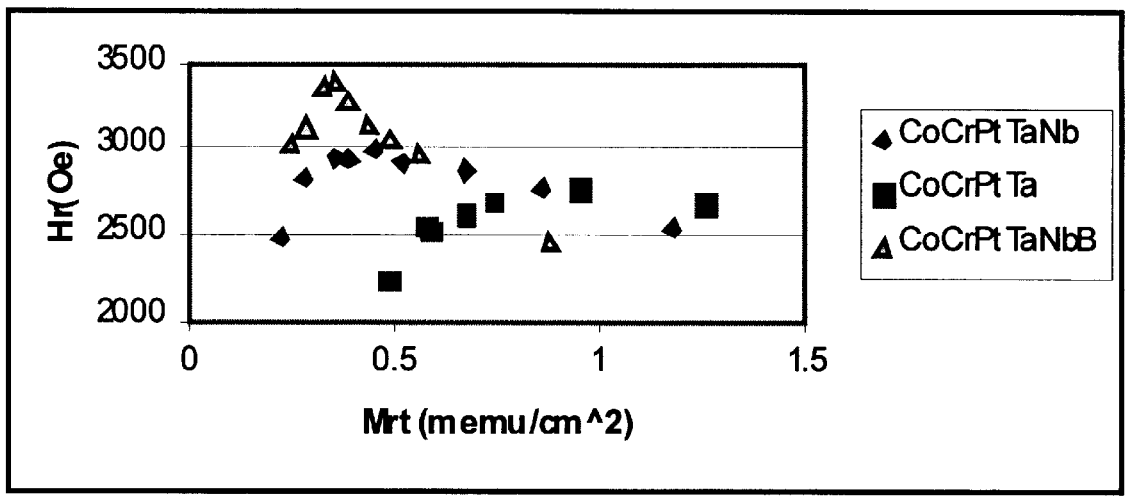

FIG. 4 shows the remanant coercivity (Hr) dependence on Mrt of media having the following film structures:

$Cr_{90}Mo_{10}/Co_{78}Cr_{17}Ta_5/Co_{66.7}Cr_{18}Pt_8Ta_2Nb_2B_{3.3}$; 200 Å $Cr/CoCr_{16}Ta_4/Co_{73}Cr_{15}Pt_8Ta_4$; and 200 Å $Cr/CoCr_{16}Ta_4/Co_{67.5}Cr_{19}Pt_{9.5}Ta_2Nb_2$.

Figure 5:
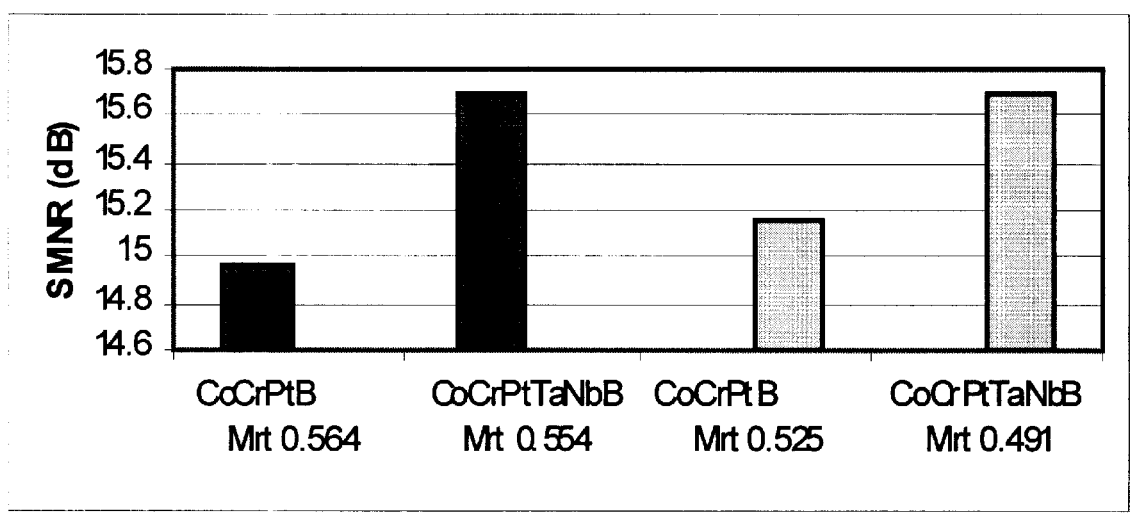

FIG. 5 shows the signal-to-medium noise ratio (SMNR) of media having the following structures:

$Cr_{80}V_{20}/Ni_{50}Al_{50}/Cr_{90}Mo_{10}/Co_{78}Cr_{17}Ta_5/Co_{66.7}Cr_{18}Pt_8Ta_2Nb_2B_{3.3}$; and $Cr_{80}V_{20}/Ni_{50}Al_{50}/Cr_{90}Mo_{10}/Co_{78}Cr_{17}Ta_5/Co_{70}Cr_{18}Pt_6B_6$.

Figure 6:
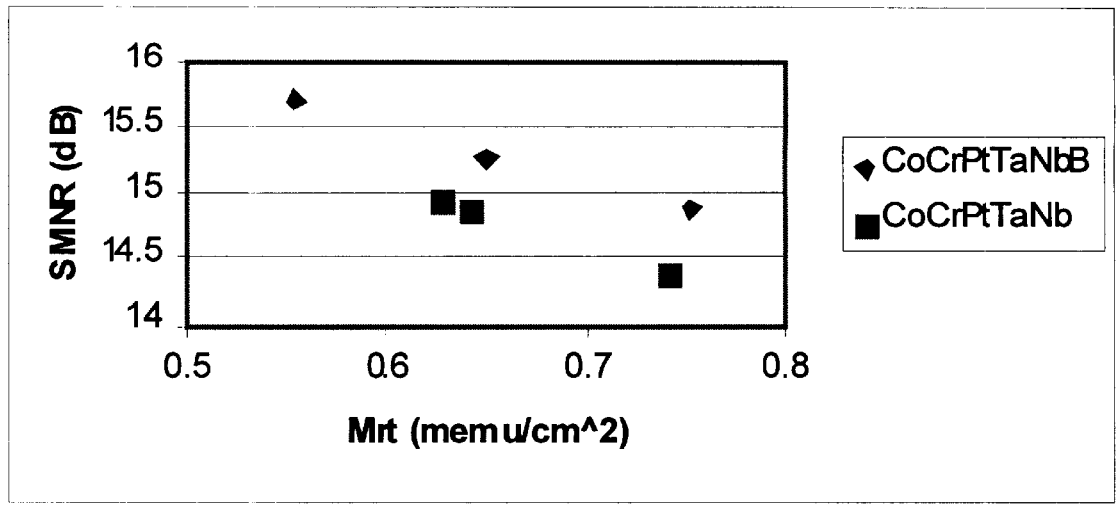

FIG. 6 shows the signal-to-medium noise ratio (SMNR) measured at 360 kfci of media having the following structures:

$Cr_{80}V_{20}/Ni_{50}Al_{50}/Cr_{90}Mo_{10}/Co_{78}Cr_{17}Ta_5/Co_{66.7}Cr_{18}Pt_8Ta_2Nb_2B_{3.3}$; and $Cr_{80}V_{20}/Ni_{50}Al_{50}/Cr_{90}Mo_{10}/Co_{78}Cr_{17}Ta_5/Co_{71}Cr_{17}Pt_8Ta_2Nb_2$.

DETAILED DESCRIPTION

This invention provides magnetic recording media suitable for high areal recording density exhibiting high Hr, and high SMNR. This invention achieves such technological advantages by using a magnetic layer having 6 elements, including Co, Cr and B, and strategically reducing the size of the grains of the magnetic layer and increasing the uniformity of the grains of the magnetic layer.

According to one embodiment of this invention, a magnetic recording medium comprises a substrate means for supporting a magnetic recording film and a magnetic recording means for recording data, wherein the magnetic recording means is located on the substrate means and comprises at least six elements including Co, Cr and B. The substrate means includes any substrate such as a glass, glass-ceramic, NiP/aluminum, metal alloys, plastic/polymer material, ceramic, glass-polymer, composite materials or other nonmagnetic materials. The magnetic recording means is a material capable of being magnetized, typically in the form of a magnetic layer.

The magnetic recording film comprises a sub-seed layer of a thickness of about 10 Å to about 1000 Å, a seed layer of a thickness of about 10 Å to about 2000 Å, an underlayer of a thickness of about 10 Å to about 1000 Å, an intermediate layer of a thickness of about 1.5 Å to about 150 Å, and a magnetic layer of a thickness of about 100 Å to about 400 Å.

In accordance with one embodiment of this invention, a CrV sub-seed layer is deposited on a substrate, such as a NiP-plated aluminum. Then a NiAl seed layer is deposited on the CrV sub-seed layer. Subsequently, a CrMo underlayer is deposited on the NiAl seed layer. On the CrMo underlayer, a CoCrTa intermediate layer is deposited. Then, a CoCrPtTaNbB magnetic layer is deposited on the CoCrTa intermediate layer. Another embodiment of this invention includes depositing a CrMo underlayer on the substrate, then depositing a CoCrTa intermediate layer on the CrMo underlayer and then a CoCrPtTaNbB magnetic layer on the intermediate layer.

Figure 1:
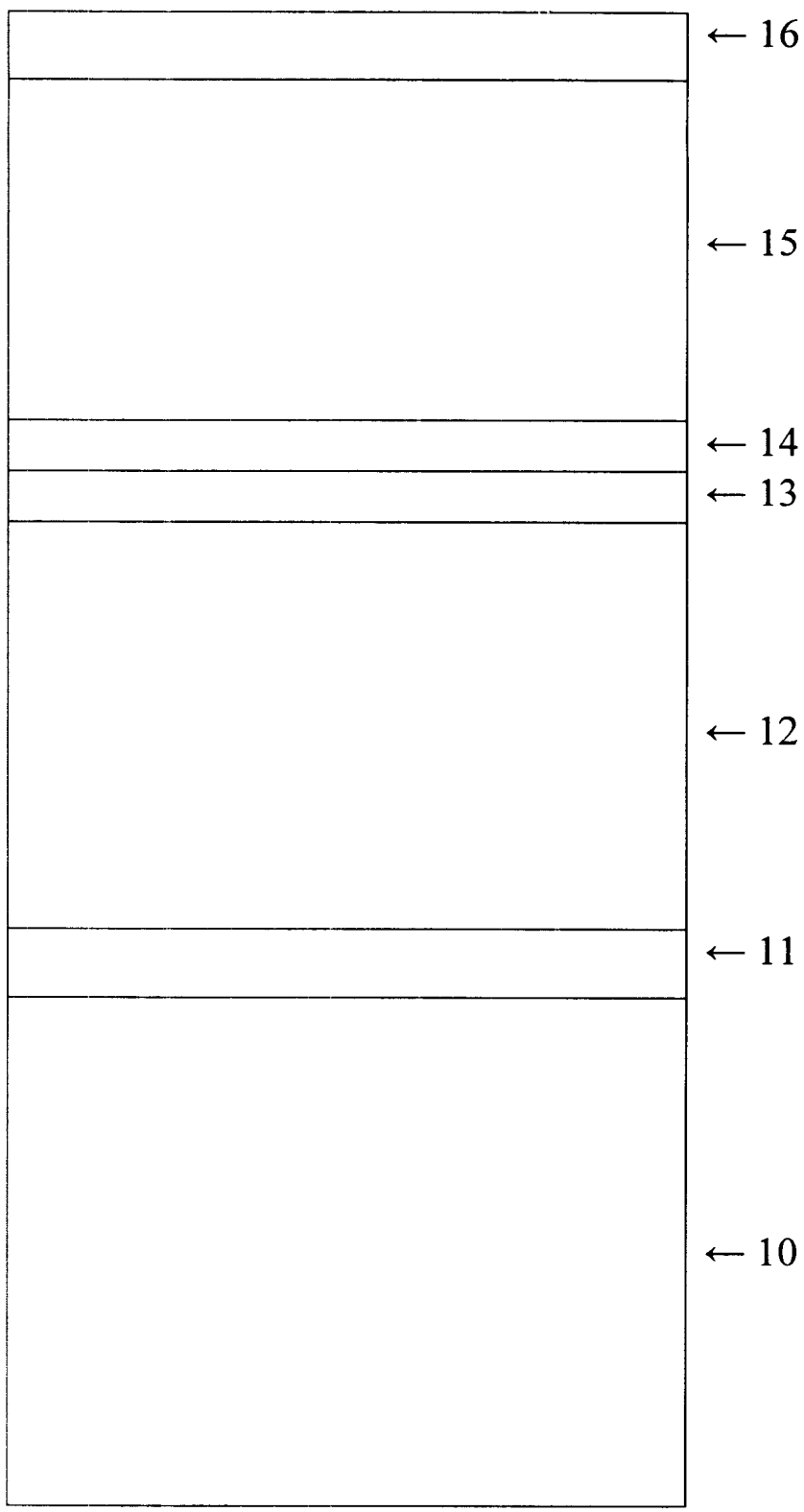
FIG. 1 schematically shows the film structure of a magnetic recording medium in accordance with an embodiment of this invention.

An embodiment of the present invention is schematically illustrated in FIG. 1 for illustrative purposes. Other embodiments of this invention include additional or fewer layers than those shown in FIG. 1 and different layer stacking sequences than that shown in FIG. 1. Even thought FIG. 1 shows sequential layers on one side of the substrate, this invention comprises sputter depositing sequentially layers on both sides of the substrate.

Adverting to FIG. 1, a CrV sub-seed layer 11 is deposited on substrate 10, e.g., a NiP-plated Al substrate. Subsequently, a NiAl seed layer 12 is deposited on the CrV sub-seed layer 11. Then, an underlayer 13, is sputter deposited on the NiAl seed layer 12. The underlayer is more preferably a CrMo underlayer comprising 5 to 25 atomic percent molybdenum.

An intermediate or flash layer of CoCrTa 14 is then sputter deposited on underlayer 13. The use of an intermediate or flash layer is also disclosed in co-pending U.S. patent application Ser. No. 09/152,326 filed on Sep. 14, 1998, now U.S. Pat. No. 6,117,570, co-pending U.S. application Ser. No. 09/188,681, filed on Nov. 10, 1998, now U.S. Pat. No. 6,150,016, co-pending U.S. application Ser. No. 09/188,715, filed on Nov. 10, 1998, now U.S. Pat. No. 6,221,481, and co-pending U.S. application Ser. No. 09/188,682, filed on Nov. 10, 1998, now U.S. Pat. No. 6,242,086 the entire disclosures of which are hereby incorporated herein by reference. The use of an intermediate CoCrTa layer increases the coercivity of the magnetic films.

Magnetic layer 15 is then sputter deposited on the intermediate CoCrTa layer. A protective covering overcoat 16 is then sputter deposited on magnetic layer 15. As in conventional practices, a lubricant topcoat (not shown in FIG. 1 for illustrative convenience) is deposited on the protective covering overcoat 16.

Figure 2:
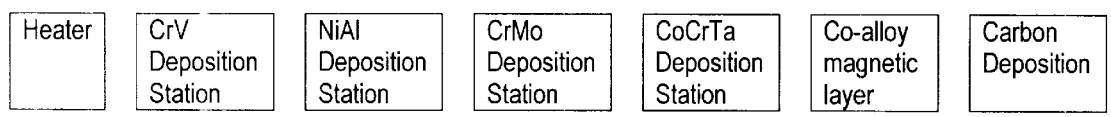
FIG. 2 schematically illustrates a sputtering system for use in implementing embodiments of this invention.

An apparatus for manufacturing magnetic recording media in accordance with the embodiments of the present invention is schematically illustrated in FIG. 2. The disk substrates travel sequentially from the heater to a CrV deposition station and a sub-seed layer is formed on the disk substrates. Then, the disk substrates travel to a NiAl station for deposition of the NiAl seed layer. Subsequent to the deposition of the sub-seed layer and the seed layer, the disk substrates are passed through the CrMo underlayer deposition station wherein the CrMo underlayer is deposited. The disk substrates are then passed through the flash CoCrTa layer deposition station wherein CoCrTa intermediate or flash layer is deposited, typically at thickness of about 1.5 to about 150 Å, e.g., about 5 to about 30 Å. The disks are then passed to the magnetic layer deposition station and then to the protective carbon overcoat deposition station.

The mechanism by which a 6-element recording layer improves recording characteristics or the role of B in this invention is not known with certainty. It is believed, however, that grain size of the Co-alloy films is reduced due to the boron addition, the magnetocrystalline anisotropy is increased and the addition of B, Ta and Nb into CoCrPt magnetic alloy enhances Cr segregation into Co-alloy grain boundaries and significantly reduces intergranular exchange coupling of magnetic grains and, therefore, the medium noise is reduced.

In a preferred embodiment, the magnetic layer is Co—Cr—Pt—Ta—Nb—B. CoCrPtTaNbB alloy with a Cr content in excess of 15 atomic percent, 5 to 15 percent Pt, 3 to 6 percent of the sum of Ta and Nb with the ratio of Ta and Nb about 1, and 2 to 14 percent Boron can be used for magnetic recording medium with low noise and high Hc at low Mrt.

Other embodiments include (a) a film structure similar to that shown in FIG. 1 without the CrV sub-seed layer and the NiAl seed layer; (b) a film structure similar to that shown in FIG. 1 and those described above in which the magnetic film comprises a 6-element alloy, including Co, Cr and B.

In a preferred embodiment, the structure of the recording medium is the following: an aluminum substrate, a CrV sub-seed layer on the substrate, a NiAl seed layer on the sub-seed layer, a CrMo underlayer on the seed layer, a CoCrTa intermediate layer on the underlayer, and a CoCrPtTaNbB magnetic layer on the intermediate layer and a protective overcoat on the magnetic layer.

In a preferred embodiment, the thickness of the sub-seed layer is about 10 Å to about 1000 Å, the thickness of the seed layer is about 10 Å to about 2000 Å, the thickness of the underlayer is about 10 Å to about 1000 Å, the thickness of the intermediate layer is about 1.5 Å to about 150 Å, and the thickness of the magnetic layer is about 100 Å to about 400 Å.

In a preferred embodiment, the thickness of the sub-seed layer is 50 Å to about 750 Å, preferably between 75 Å and 450 Å, and most preferably about 300 Å. In a preferred embodiment, the thickness of the seed layer is 20 Å to about 1000 Å, preferably between 35 Å and 500 Å, and most preferably about 50 Å. In a preferred embodiment, the thickness of the underlayer is 20 Å to about 500 Å, preferably between 35 Å and 250 Å, and most preferably about 75 Å. In a preferred embodiment, the thickness of the intermediate layer is 5 Å to about 120 Å, preferably between 35 Å and 100 Å, and most preferably about 80 Å. In a preferred embodiment, the thickness of the magnetic layer is 120 Å to about 350 Å, preferably between 125 Å and 200 Å, and most preferably about 150 Å. In a preferred embodiment, the thickness of the protective layer is 20 Å to about 300 Å, preferably between 30 Å and 100 Å, and most preferably about 50 Å. The protective layer is made of hydrogenated carbon ($CH_x$).

The magnetic recording medium has a remanent coercivity of about 2000 to about 10,000 Oersted, and an Mrt (product of remanance, Mr, and magnetic layer thickness, t) of about 0.2 to about 2.0 memu/cm$^2$. In a preferred embodiment, the coercivity is about 2400 to about 9000 Oersted, more preferably in the range of about 2800 to about 6000 Oersted, and most preferably in the range of about 3000 to about 5000 Oersted. In a preferred embodiment, the Mrt is about 0.25 to about 1.5 memu/cm$^2$, more preferably in the range of about 0.3 to about 0.7 memu/cm$^2$, and most preferably in the range of about 0.35 to about 0.6 memu/cm$^2$.

Embodiments of this invention include sputter depositing CrV layer on a NiP-plated Al substrate to form a CrV sub-seed layer. Embodiments of this invention include deposition of a NiAl seed layer on the CrV sub-seed layer and subsequent deposition of an underlayer, such as Cr or a Cr-alloy underlayer, e.g., CrMo, on the NiAl seed layer.

This invention includes depositing a thin intermediate magnetic layer on the underlayer and depositing the magnetic layer on the intermediate layer. The intermediate layer comprises a CoCrTa layer, which can comprise about 10 to about 40 atomic percent Cr and about 0 to about 6 atomic percent Ta.

Embodiments of this invention include the use of any of the various magnetic alloys containing Co, Cr and B and 3 other elements, e.g., CoCrPtTaNbB, and other combinations of B, Cr, Co, Pt, Ni, Ta and Nb, in the magnetic layer.

EXAMPLES

All samples described in this disclosure were fabricated with DC magnetron sputtering except carbon films were made with AC magnetron sputtering. Disc samples were fabricated with in-line pass-by sputter machine on mechanically textured NiP-plated Al substrates.

Figure 3:
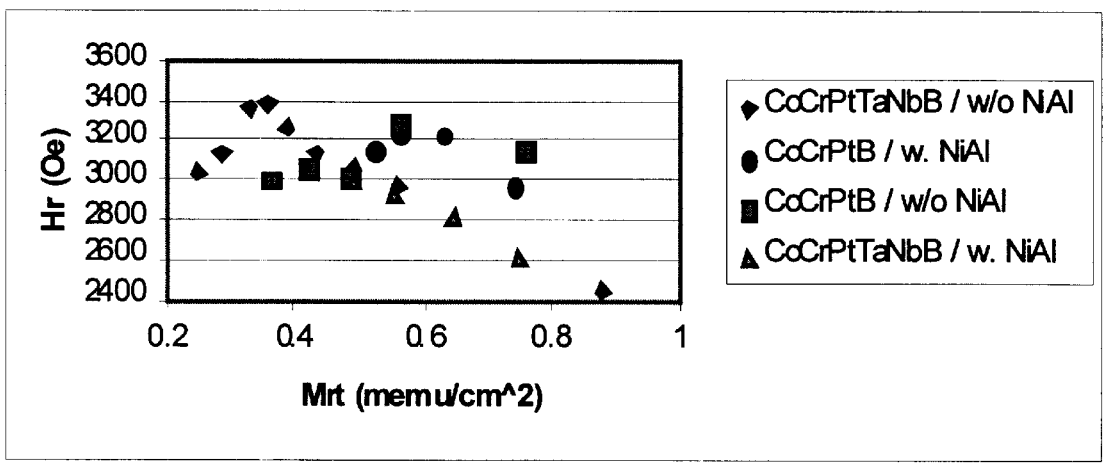
FIG. 3 shows the remanant coercivity (Hr) dependence on Mrt of media having the following structures.

FIG. 3 shows the remanant coercivity (Hr) dependence on Mrt of 4 kinds of media measured with a rotating disc magnetometer (RDM). Table 1 lists the film structure of the discs. The composition of the films listed in Table 1 in atomic percent is $Cr_{80}V_{20}$, $Ni_{50}Al_{50}$, $Cr_{90}Mo_{10}$, $Co_{78}Cr_{17}Ta_5$, $Co_{70}Cr_{18}Pt6B_6$, and $Co_{66.7}Cr_{18}Pt_8Ta_2Nb_2B_{3.3}$.

TABLE 1

| Label on FIG. 3 | Film structure | CrV (Å) | NiAl (Å) | CrMo (Å) | CoCrTa (Å) |
|---|---|---|---|---|---|
| CoCrPtTaNbB/ w. NiAl | CrV/NiAl/CrMo/CoCrTa/CoCrPtTaNbB | 300 | 50 | 75 | 80 |
| CoCrPtB/ w. NiAl | CrV/NiAl/CrMo/CoCrTa/CoCrPtB | 300 | 50 | 75 | 80 |
| CoCrPtB/ w/o NiAl | CrMo/CoCrTa/CoCrPtB | 0 | 0 | 240 | 80 |
| CoCrPtTaNbB/ w/o NiAl | CrMo/CoCrTa/CoCrPtTaNbB | 0 | 0 | 270 | 80 |

FIG. 4 shows the remanant coercivity (Hr) dependence on Mrt of media with 3 kinds of magnetic alloy. The media labeled as CoCrPtTaNbB are the same as "CoCrPtTaNbB/ w/o NiAl" in Table 1. Another two kinds of media have film structure of 200 Å Cr/CoCr$_{16}$Ta4/CoPt-alloy. The CoPt-alloy is Co$_{73}$Cr$_{15}$Pt$_8$Ta4 and Co$_{67.5}$Cr$_{19}$Pt$_{9.5}$Ta$_2$Nb$_2$ respectively.

FIGS. 3 and 4 illustrate that the media with CoCrPtTaNbB alloy have the coercivity maximum at low Mrt.

FIG. 5 compares the signal-to-medium noise ratio (SMNR) of the media with structure similar with that of "CoCrPtB/w. NiAl "and "CoCrPtTaNbB/w. NiAl "listed in Table 1 respectively. The composition of CoCrPtB and CoCrPtTaNbB was identical with that mentioned above. The SMNR was measured at 360 kfci (thousands of flux change per inch). The media with CoCrPtTaNbB alloy have higher SMNR than that of CoCrPtB media with similar Mrt.

FIG. 6 compares the SMNR of the media with CoCrPtTaNb and CoCrPtTaNbB measured at 360 KFCI. The film structure is similar with that of the media in FIG. 5 except the CoCrPtTaNb alloy, which has the composition of Co$_{71}$Cr$_{17}$Pt$_8$Ta$_2$Nb2. The media with CoCrPtTaNbB alloy have higher SMNR than that of CoCrPtTaNb alloy.

Tables 2–5 shows the data of FIGS. 3–6.

TABLE 2

| Mrt (memu/cm²) | Hr (Oe) | | | |
|---|---|---|---|---|
| | CoCrPtTaNbB/ w/o NiAl | CoCrPtB/ w. NiAl | CoCrPtB/ w/o NiAl | CoCrPtTaNbB/ w. NiAl |
| 0.249 | 3037 | | | |
| 0.286 | 3131 | | | |
| 0.329 | 3365 | | | |
| 0.358 | 3389 | | | |
| 0.365 | | | 3005 | |
| 0.388 | 3269 | | | |
| 0.411 | | | | |
| 0.419 | | | 3063 | |
| 0.434 | 3137 | | | |
| 0.484 | | | 3017 | |
| 0.491 | 3059 | | | |
| 0.491 | | | | 2998 |
| 0.525 | | 3143 | | |
| 0.554 | | | | 2932 |
| 0.560 | 2965 | | | |
| 0.564 | | 3234 | | |
| 0.564 | | | 3273 | |
| 0.634 | | 3232 | | |
| 0.650 | | | | 2803 |
| 0.744 | | 2960 | | |
| 0.751 | | | | 2617 |
| 0.760 | | | 3140 | |
| 0.881 | 2449 | | | |

TABLE 3

| Mrt (memu/cm²) | Hr(Oe) | | |
|---|---|---|---|
| | CoCrPtTaNb | CoCrPtTa | CoCrPtTaNbB |
| 0.225 | 2476 | | |
| 0.249 | | | 3037 |
| 0.279 | 2832 | | |
| 0.286 | | | 3131 |
| 0.329 | | | 3365 |
| 0.358 | | | 3389 |
| 0.359 | 2939 | | |
| 0.388 | 2937 | | |
| 0.389 | | | 3269 |
| 0.434 | | | 3137 |
| 0.457 | 2992 | | |
| 0.490 | | 2236 | |
| 0.491 | | | 3059 |
| 0.521 | 2919 | | |
| 0.560 | | | 2965 |
| 0.579 | | 2561 | |
| 0.591 | | 2523 | |
| 0.673 | 2874 | | |
| 0.673 | | 2631 | |
| 0.744 | | 2690 | |
| 0.86 | 2765 | | |
| 0.881 | | | 2449 |
| 0.948 | | 2769 | |
| 1.176 | 2543 | | |
| 1.254 | | 2678 | |

TABLE 4

| Material | Mrt (memu/cm²) | SMNR (dB) |
|---|---|---|
| CoCrPtB | 0.564, 0.525 | 14.97, 15.1 |
| CoCrPtTaNbB | 0.554, 0.491 | 15.7, 15.6 |

TABLE 5

| Material | Mrt (memu/cm²) | SMNR (dB) |
|---|---|---|
| CoCrPtTaNbB | 0.554, 0.65, 0.751 | 15.7, 15.26, 14.88 |
| CoCrPtTaNb | 0.628, 0.642, 0.742 | 14.93, 14.86, 14.39 |

The recording media with CoCrPtTaNbB alloy in the magnetic layer have high coercivity at low Mrt and low medium noise, and are suitable for high-density magnetic recording. The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

What is claimed is:

1. A magnetic recording medium comprising:

a substrate and means comprising at least six elements including Co, Cr, B, Pt, Ta and Nb for recording data, wherein the magnetic recording medium exhibits a higher signal-to-noise ratio (SNR) measured at 360 kfci than that of an another magnetic recording medium having a same structure as that of the magnetic recording medium except that the magnetic layer of the another magnetic recording medium consists of $Co_{71}Cr_{17}Pt_8Ta_2Nb_2$ measured at 360 kfci.

2. The magnetic recording medium of claim 1, further comprising:

a sub-seed layer on said substrate;

a seed layer on said sub-seed layer;

an underlayer on said seed layer;

an intermediate layer on said underlayer, and said magnetic recording means is a magnetic layer on said intermediate layer.

3. The magnetic recording medium of claim 1, which has a remanent coercivity of about 2000 to about 10,000 Oersted, and an Mrt of about 0.2 to about 2.0 memu/cm².

4. A magnetic recording medium comprising:

a substrate and a magnetic layer on said substrate, wherein said magnetic layer comprises at least six elements including Co, Cr, Pt, Ta, Nb and B;

further wherein the magnetic recording medium exhibits a higher signal-to-noise ratio (SNR) measured at 360 kfci than that of an another magnetic recording medium having a same structure as that of the magnetic recording medium except that the magnetic layer of the another magnetic recording medium consists of $Co_{71}Cr_{17}Pt_8Ta_2Nb_2$ measured at 360 kfci.

5. The magnetic recording medium of claim 4, wherein said Cr is in excess of 15 atomic percent, said Pt is 5 to 15 atomic percent, the sum of said Ta and said Nb is 3 to 6 atomic percent, the ratio of said Ta and said Nb is about 1, said B is 2 to 14 atomic percent and said Co is the balance.

6. The magnetic recording medium of claim 4, further comprising an underlayer between said substrate and said magnetic layer.

7. The magnetic recording medium of claim 6, wherein the underlayer comprises CrMo.

8. The magnetic recording medium of claim 6, further comprising an intermediate layer between said underlayer and said magnetic layer.

9. The magnetic recording medium of claim 8, wherein said intermediate layer comprises CoCrTa.

10. The magnetic recording medium of claim 8, further comprising:

a seed-layer between said substrate and said underlayer, and a sub-seed layer between said substrate the seed layer.

11. The magnetic recording medium of claim 10, wherein the thickness of the sub-seed layer is about 10 Å to about 1000 Å, the thickness of the seed layer is about 10 Å to about 2000 Å, the thickness of the underlayer is about 10 Å to about 1000 Å, the thickness of an intermediate layer is about 1.5 Å to about 150 Å, and the thickness of the magnetic layer is about 100 Å to about 400 Å, wherein the intermediate layer is between the underlayer and the magnetic layer.

12. The magnetic recording medium of claim 4, which has a remanent coercivity of about 2000 to about 10,000 Oersted, and an Mrt of about 0.2 to about 2.0 memu/cm$^2$.

13. The magnetic recording medium of claim of claim 4, wherein the magnetic layer comprises a following composition: Cr is in excess of 15 atomic percent, Pt is 5 to 15 atomic percent, the sum of Ta and Nb is 3 to 6 atomic percent, the ratio of said Ta and said Nb is about 1, B is 2 to 14 atomic percent and Co is the balance.

14. The recording medium of claim 10, wherein the sub-seed layer comprises CrV, the seed layer comprises NiAl, the underlayer comprises CrMo and the intermediate layer comprises CoCrTa.

15. The recording medium of claim 8, the underlayer consists essentially of CrMo.

16. A method of manufacturing a magnetic recording medium, comprising:

depositing an underlayer on a substrate;

depositing an intermediate layer on the underlayer; and depositing a magnetic layer on the intermediate layer, wherein said magnetic layer comprises at least six elements including Co, Cr, Pt, Ta, Nb and B;

further wherein the magnetic recording medium exhibits a higher signal-to-noise ratio (SNR) measured at 360 kfci than that of an another magnetic recording medium having a same structure as that of the magnetic recording medium except that the magnetic layer of the another magnetic recording medium consists of $Co_{71}Cr_{17}Pt_8Ta_2Nb_2$ measured at 360 kfci.

17. The method according to claim 16, wherein said Cr is in excess of 15 atomic percent, said Pt is 5 to 15 atomic percent, the sum of said Ta and said Nb is 3 to 6 atomic percent, the ratio of said Ta and said Nb is about 1, said B is 2 to 14 atomic percent and said Co is the balance.

18. The method according to claim 16, wherein said intermediate layer comprises CoCrTa and comprises about 10 to about 40 atomic percent Cr and about 0 to 6 atomic percent Ta.

19. The method according to claim 16, wherein the underlayer comprises CrMo.

20. The method according to claim 16, wherein the seed layer comprises NiAl and the sub-seed layer comprises CrV.

21. The method according to claim 16, wherein the thickness of the sub-seed layer is about 10 Å to about 1000 Å, the thickness of the seed layer is about 10 Å to about 2000 Å, the thickness of the underlayer is about 10 Å to about 1000 Å, the thickness of the intermediate layer is about 1.5 Å to about 150 Å, and the thickness of the magnetic layer is about 100 Å to about 400 Å.

22. The method of claim 16, wherein the underlayer comprises CrMo and the intermediate layer comprises CoCrTa.

23. The method of claim 16, wherein the underlayer consists essentially of CrMo.

\* \* \* \* \*